United States Patent [19]

Balyasny et al.

[11] Patent Number: 4,567,650
[45] Date of Patent: Feb. 4, 1986

[54] FIBER OPTIC CRIMPING TOOL

[75] Inventors: Marik Balyasny, Van Nuys; Douglas A. Parker, Lomita, both of Calif.

[73] Assignee: Automation Industries, Inc., Greenwich, Conn.

[21] Appl. No.: 598,170

[22] Filed: Apr. 9, 1984

[51] Int. Cl.[4] .................. B23P 19/00; B23Q 3/00; B21D 41/00; G02B 5/14

[52] U.S. Cl. .................. 29/822; 29/33 E; 29/33 K; 29/283.5; 29/517; 29/700; 72/402; 279/71; 350/96.20

[58] Field of Search ............... 29/234, 237, 243.52, 29/283.5, 700, 745, 747, 753, 757, 517, 33 E, 33 K, 822; 350/96.20, 96.21, 96.22; 279/71, 114; 72/402, 410

[56] References Cited

U.S. PATENT DOCUMENTS

| 1,435,035 | 11/1922 | Walroden | 279/71 X |
|---|---|---|---|
| 1,533,875 | 4/1925 | McCleary | 279/71 X |
| 1,565,227 | 12/1925 | Garrison | 279/71 |
| 2,377,829 | 6/1945 | Vaill | 29/282 X |
| 2,688,133 | 9/1954 | Berg | 29/33 E X |
| 3,028,776 | 4/1962 | Keller et al. | 29/517 |
| 3,451,116 | 6/1969 | Shields | 29/822 |
| 3,789,485 | 2/1974 | Gudmestad | 350/96.20 X |
| 4,019,241 | 4/1977 | Logan | 29/447 X |
| 4,217,084 | 4/1980 | Jacques et al. | 264/1.5 X |
| 4,469,400 | 9/1984 | Hakoun | 350/96.21 |
| 4,486,072 | 12/1984 | Roberts | 350/96.21 |

FOREIGN PATENT DOCUMENTS

| 2417122 | 10/1979 | France | 350/96.2 |
| 125914 | 8/1982 | Japan | 350/96.2 |

Primary Examiner—Howard N. Goldberg
Assistant Examiner—R. S. Wallace
Attorney, Agent, or Firm—Thomas L. Flattery

[57] ABSTRACT

An optical fiber with a bare end portion is faced-off precisely at 90 degrees. With an unsecured ferrule loosely located on the fiber, the fiber is passed through oversize openings in a fiber holder and a crimping station. The bare fiber portion is located in the interstice of three rods having identical diameters and the assembly is releasably held by jaws in a holding station. The faced-off fiber end is positioned slightly inwardly from the end faces of the rods by a limit pin. The fiber holder is tightened onto the fiber to maintain it in straightened condition and the ferrule is then slid into place over the three rods and included fiber. The crimping station is moved along a track toward the holding station until crimping jaws are positioned about the ferrule, three rods and fiber. Crimping jaws deform the ferrule at several different places firmly securing it in place on the rods.

9 Claims, 23 Drawing Figures

FIBER OPTIC CRIMPING TOOL

The present invention relates broadly to a connector for fiber optics, and, more particularly, to apparatus for securing a connector part to an optical fiber so as to maintain optimum efficiency of light signal transmission between a pair of optical fibers mounted in respective connector parts and arranged in end-facing, closely spaced relation.

BACKGROUND

Fiber optics, consisting generally of glass or plastic fibers along which light signals are passed, are finding ever increasing use for a variety of different purposes, such as communications, for example. Signal transmission through optical fibers requires means to concatenate fibers in systems applications. On occasion, an optical fiber becomes broken impairing its ability to transmit optical signals and requiring either replacement, substitution of another fiber therefor or repair. In many situations, the only practical solution to field application installations or repairs of optical fibers is to perform the necessary operations without removing the fiber from its use environment. Whether as an initial installation or as a repair measure, fibers must be properly prepared and provision for protection of fiber-to-fiber junctions must be insured in a manner as described herein.

To join or relate the ends of two individual fibers satisfactorily, or to relate the ends of broken fibers so that highly efficient transfer of light signals across the junction can be achieved essentially requires three things: (1) the end of the optical fibers to be interconnected must be faced-off precisely at 90 degrees to the fiber longitudinal dimension; (2) the faced-off ends of the fibers to be joined must be located very closely to one another and precisely aligned axially; and (3) the holder or connector securing the fiber optics to meet conditions (1) and (2) must produce alignment of the centerlines of the two fibers.

A highly successful form of fiber optic connector includes two sets of three precisely uniform diameter rods which are extended along a fiber to be interconnected so as to hold the fiber within the interstice of the rods when the rods are arranged collinearly in a peripheral surface contacting manner. A ferrule with a deformable body wall is located about the three pins and included fiber and is crimped thereon to secure the fiber between the rods. Two fibers with their ends faced-off are included within separate sets of three pins and a connector ferrule, then fitted together by an alignment sleeve in order that they will have their ends facing one another and maintained slightly spaced with the fibers collinear. Such a connector is more fully described in co-pending U.S. application Ser. No. 306,330, filed Sept. 30, 1981, now abandoned, for OPTICAL FIBER CONNECTORS by John Gresty and assigned to the same assignee as the present application.

Known apparatus for securing a deformable connector onto an optical fiber are not completely satisfactory. One apparatus for this purpose is that described in U.S. Pat. No. 4,217,084 granted Aug. 12, 1980 "Device for Crimping Ferrules Onto Bundles of Optical Fibers". This patented device is a portable means for manually crimping metallic ferrules onto bundles of optical fibers in which a number of fibers are hexagonally arranged within the deformed metallic ferrules. However, the patented device will not provide satisfactorily firm and rigid crimping with controlled radial lines of force which will match the profile of the rods holding the fiber. Also, the necessity for a different crimping at more than one location along the rods cannot be provided by the patented device.

SUMMARY

Preliminary to handling by the apparatus described herein, the optical fiber has its cladding removed from an end portion leaving a bare fiber for a predetermined length and the fiber terminus is faced-off precisely at 90 degrees to the fiber longitudinal axis. With an unsecured connector part or ferrule loosely located on the optical fiber, the fiber is then passed through oversize openings in a fiber holder and a crimping station.

The free end of the bare fiber is located in the interstice of three rods having identical diameters disposed with their peripheries contacting one another, and the assemblage is releasably held by selectively adjustable jaws in a holding station. The faced-off fiber end is positioned slight inwardly from the aligned end faces of the rods by a limit pin mounted within the holding station jaws.

The fiber is straightened and the fiber holder tightened down on the fiber to maintain it in the straightened condition. The ferrule is then slid into place over the three rods and included fiber. The crimping station is moved along a track toward the holding station until crimping jaws are positioned about the ferrule, three rods and fiber. The crimping jaws then clampingly engage the ferrule deforming it at several different places by the application of uniformly applied forces and thereby firmly securing it in place on the rods. In this way the fiber is precisely and fixedly located within the connector part ferrule and all accomplished without leaving the fiber in torsion.

DESCRIPTION OF PREFERRED EMBODIMENTS

Figure 15:
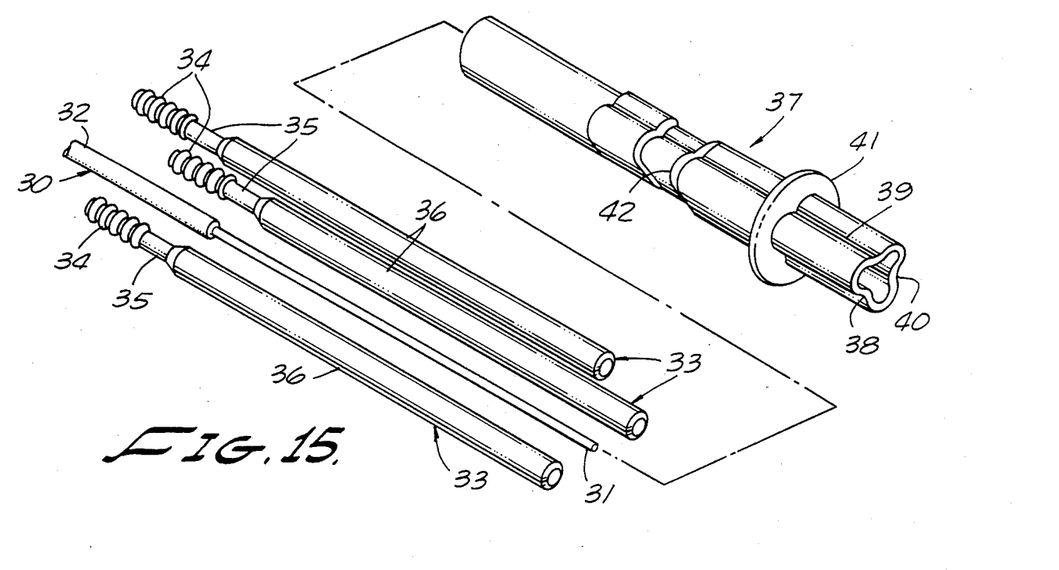
FIG. 15 is an exploded view of an optical fiber, three fiber alignment rods and a connector part ferrule.

As can be seen best in FIG. 15 of the application drawings, a buffer-jacketed optical fiber 30 which is to be secured within a connector part in a manner to be described herein, includes a glass or plastic core and cladding 31, the cladding coaxially concentric with the core and an insulative protective coating or buffer jacketing 32. In use, an optical signal entering at one end of the fiber core traverses the entire fiber length and exits at the other end to assimilation or processing equipment. In the event two fibers or two pieces of the same fiber are to be connected, the ends of these fibers must be faced off cleanly and precisely at 90 degrees to the fiber longitudinal axis, and the fibers must be precisely aligned with their end faces closely spaced but not contacting one another. If these conditions are not adhered to, the light beam passing across the connective junction will suffer reflection and/or scattering losses that degrade the beam. As depicted in the drawing, attendant mounting within a connector part a length of the coating or covering material 32 is removed from the optical fiber leaving an extent of bare fiber.

Three identical alignment rods 33 are needed for each connector terminus, each one of which includes an end portion 34 having a plurality of circumferentially extending ridges, an immediately adjacent reduced diameter portion 35 and a smooth-surfaced cylindrical portion 36 of uniform diameter extending for a length slightly less than the bare fiber to be secured thereby. In assembly, the three rods 33 are received about a fiber 30 with the peripheries of the cylindrical portions 36 contacting each other and the bare fiber, and the ridges 34 bitingly clamp into the fiber buffer-jacketing 32. The rods with included fiber are then slidingly positioned within a hollow metal tubular connector part or ferrule 37 in a way that will be described in detail herein. The connector part 37 is then deformed or crimped inwardly so as to clampingly engage the rods 33 and fiber 30 therewithin and positively position the fiber in a properly aligned relationship between the rods 33 with the outer end of the fiber being spaced slightly inwardly of the outer ends of the rods. Both fibers to be interconnected must be mounted in separate connector parts 37 and the two connector parts are received within an alignment sleeve (not shown) such that the outer end portions of both of the fibers with their retaining rods are located with the fibers very precisely aligned and the fiber end faces spaced from each other on the order of less than 0.001 of an inch.

Still referring to FIG. 15, the crimping of the connector part 37 that is to be achieved with the present apparatus and in the manner described herein, is produced along a first set of longitudinally extending grooves 38, 39 and 40 that are located at both sides of a mounting and positioning upset 41. The apparatus also crimps a short section 42 of the connector part body which lies immediately opposite the ridges 34 of the rods 33 when they are properly located within the connector part, in order to drive the ridges into the cladding of the retained fiber, thereby securing the rods and fiber immovably at a predetermined location within the connector part. It is important throughout crimping of the connector part 37 onto the rods 33 and fiber, that balanced and uniform forces be applied to the fiber so as not to induce any stress or torque into or uneven bending of the fiber since in final use this would tend to degrade the signal transmitting capacity.

Major Parts and Operation of Crimping Apparatus

Figure 1:
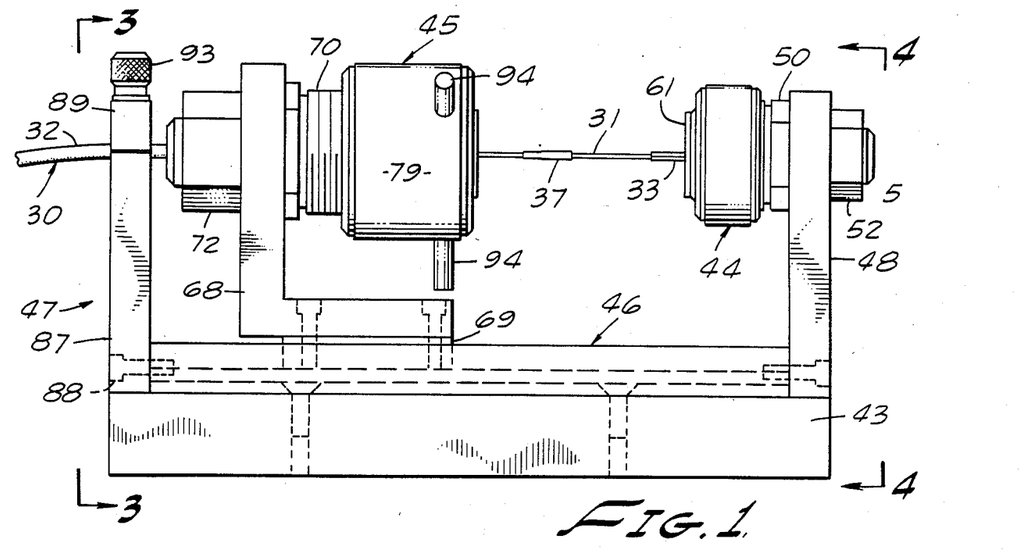
FIG. 1 is a side elevation view of the crimping apparatus described herein.
Figure 2:
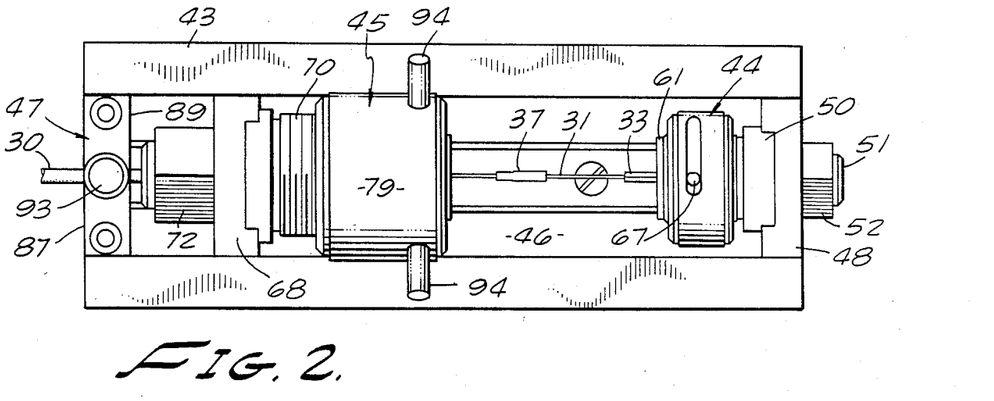
FIG. 2 is a top plan, elevational view of the apparatus of FIG. 1 showing the crimping and holding stations separated.

For the ensuing description of the apparatus for positively locating and securing the connector part 37 onto a set of three rods 33 with included optical fiber, reference is primarily made to FIGS. 1 and 2. An elongated base plate 43 having an upwardly directed, generally horizontal surface includes adjacent one end a holding station 44 mounted on the upper surface which accomplishes as its primary function retention and relative positioning of the three alignment rods 33 and included fiber while the connector part 37 is being fitted thereabout attendant securement in place.

A crimping station 45 having selectively actuatable parts for applying a deforming force onto the exterior surface of the connector part or ferrule 37 is slidably mounted on a set of tracks 46 located on the upper surface of the base plate 43 to move along a path toward or away from the holding station. Also affixed to the upper surface of the base plate and extending upwardly therefrom is an optical fiber cable holding means 47 located along the axis of the path of movement of the crimping station 45.

Briefly as to general operation of the apparatus as described to this point, the optical fiber 30 has an end portion thereof stripped of its protective buffer-jacketing and an end face which is faced-off at precisely 90 degrees to the fiber axis, passed through oversize openings in the fiber cable holding means 47 and the crimping station 45 to terminate in the holding station 44 where it is releasably held within three locating pins 33 in a manner already described. An uncrimped ferrule or connector part 37 initially loosely received onto the bare or stripped fiber is slid over and onto the holding pins and properly located thereon after which the crimping station is moved along its track in order to locate pressure exerting jaws over the ferrule. These jaws then crimp the connector part ferrule onto the rods and included fiber. Finally, the crimping jaws, holding station and fiber holding means are all released and the crimped fiber optic terminus assembly is removed from the apparatus.

Holding Station

Figure 6:
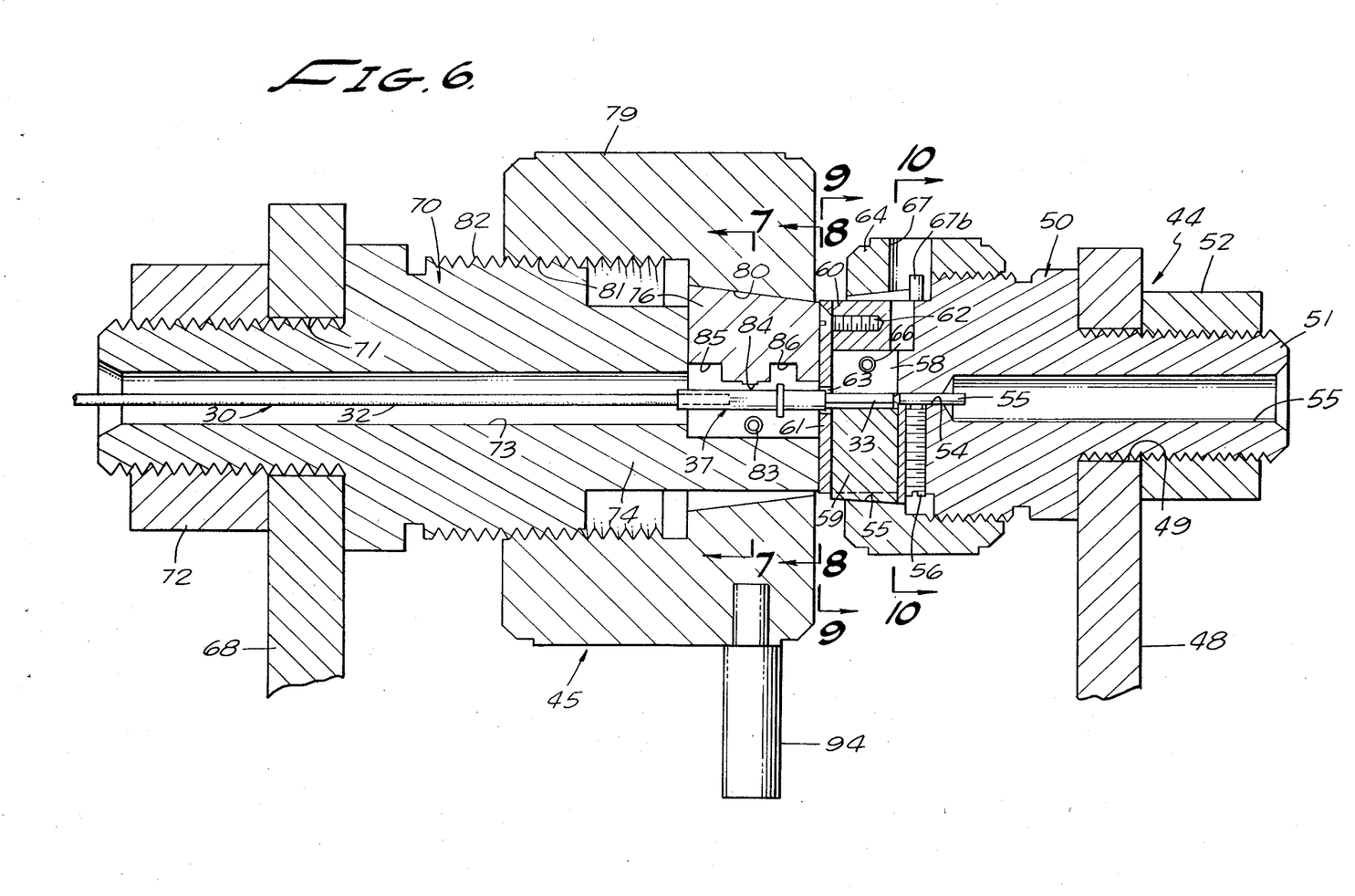
FIG. 6 is a side elevational sectional view taken along the line 6—6 of FIG. 5.

Turning now to both FIGS. 1 and 6, the holding station 44 includes an upright stanchion 48 suitably affixed to the upper surface of the base plate 43 and through which an opening 49 is formed closely adjacent its upper extremity. A head portion 50 has a threaded shaft 51 received through the opening 49 and onto which a nut 52 is secured. The head portion is cylindrical with an axial opening extending therethrough including an enlarged diameter part 53 serving as the exit and a smaller diameter part 54 forming the entrance.

A cylindrical metal pin 55 with a pointed end has an outer diameter sufficient so that it may be snugly received within the opening 54 with the pointed end facing toward the crimping station. A threaded member 56 fixes the pin within the opening.

Figures 9, 10, 11, 12, 13, 14:
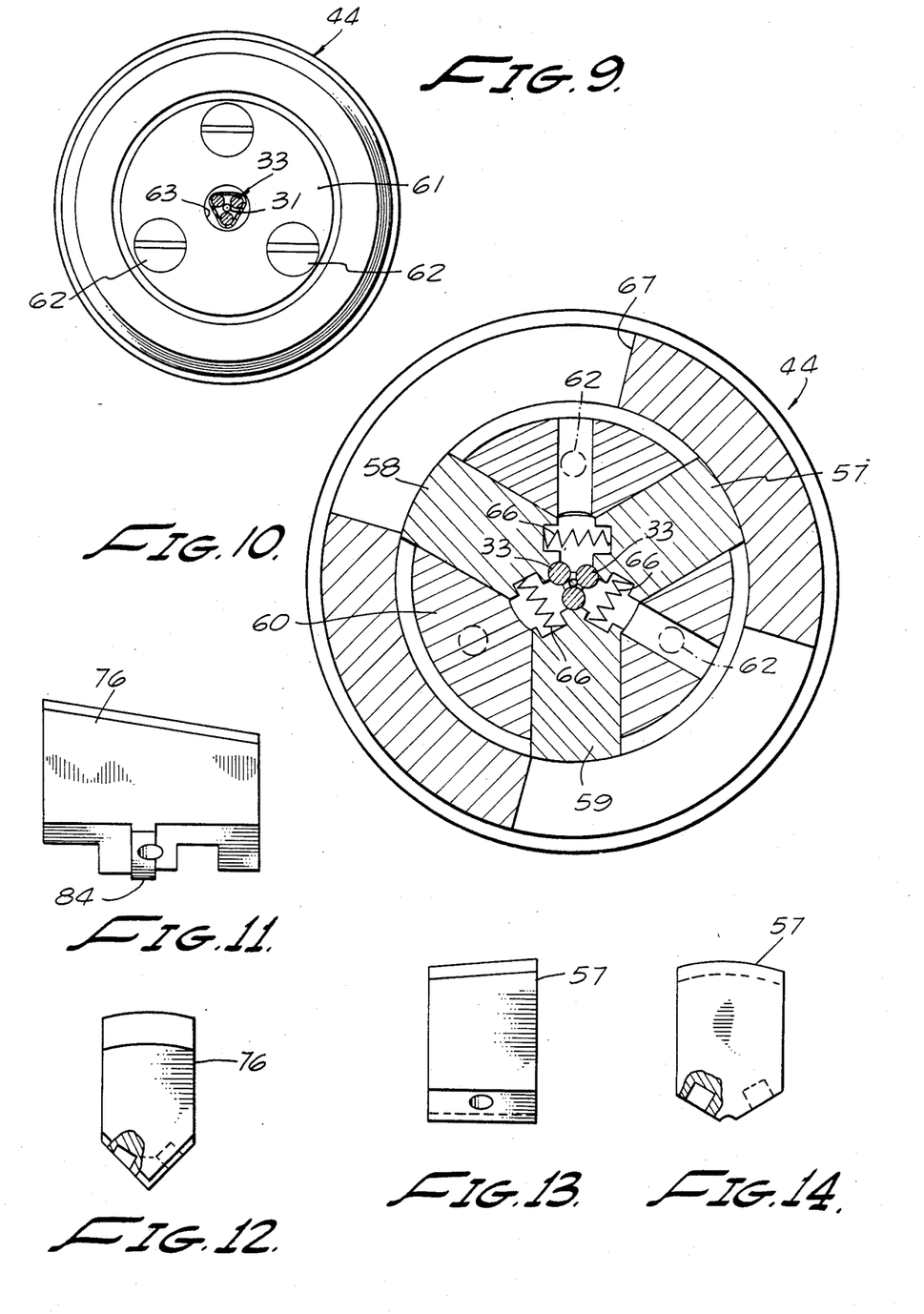
FIG. 11 is a side elevational view of a jaw used in the crimping station.
FIG. 12 is a further view of the crimping jaw of FIG. 11 taken at 90 degrees thereto.
FIG. 13 is a jaw in the holding station.
FIG. 14 is a further view of the holding jaw taken at 90 degrees to FIG. 13.

With reference now additionally to FIGS. 9 and 10, three chuck jaws 57-59 arranged at 120 degrees with respect to each other are radially adjustable toward and away from an axis which is an extension of and collinear with the axis of openings 53 and 54. The chuck jaws are slidingly received within suitably formed openings in a cylindrical body member 60 which is integral with the head portion 50 and extends toward the crimping station. A face plate 61 (FIG. 9) is received over the outwardly facing end of 60 and secured thereto by threaded means 62. An opening 63 in the face plate is collinear with the axis of openings 53 and 54 and of a sufficient diameter to readily permit the leading end of the ferrule connector part 37 to pass therethrough.

A coupling ring 64 has a threaded opening for receipt upon a similarly threaded periphery of the head 50 and a tapered inwardly directed wall 65 for contacting a similarly tapered periphery of the chuck jaws 57-59. In the conventional manner, adjustment of the coupling ring 64 moves the jaws 57-59 inwardly towards each other. A plurality of springs 66 interrelate the inner end portions of the jaws 57-59 such that when the coupling ring is adjusted to release the jaws, the springs will automatically move them apart.

As can be seen best in FIG. 10, the inner end surfaces of the jaws are formed into axially extending cylindrical grooves in order that they may fittingly grip a set of three rods 33 and included fiber therewithin in the respective grooves.

A viewing port slot 67 (FIGS. 2 and 6) for observation of fiber/rods relative position extends circumferentially through the wall of the coupling ring 64 allowing verification of correct component juxtaposition. A limit stop 67b spacer fills the thread relief void to prevent tightening the coupling ring beyond a predetermined maximum and applying undue force to the rods 33 either damaging them and/or the included fiber.

In use, the bare end of the fiber with a set of three rods 33 about it are inserted through the opening 63 of the face plate 61 and are moved forwardly until the pointed end of the pin 55 extends very slightly into the interstice between the rods thereby precisely locating the outermost end of the bare fiber. When this adjustment is obtained, the coupling ring is then rotated in the direction to clamp the rods and fiber securely, but not so tightly as to harm either the fiber or alignment rods. At the conclusion of the crimping operation to be described, the coupling ring is then rotated in the opposite direction to release the crimped three rod/fiber assembly.

Crimping Station

Figure 3:
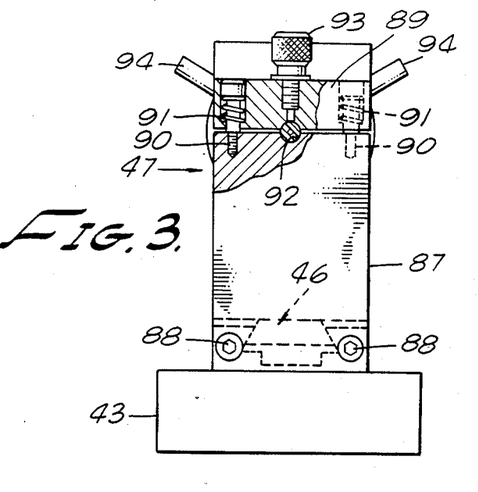
FIG. 3 is a left end elevational view taken along the line 3—3 of FIG. 1.
Figure 4:
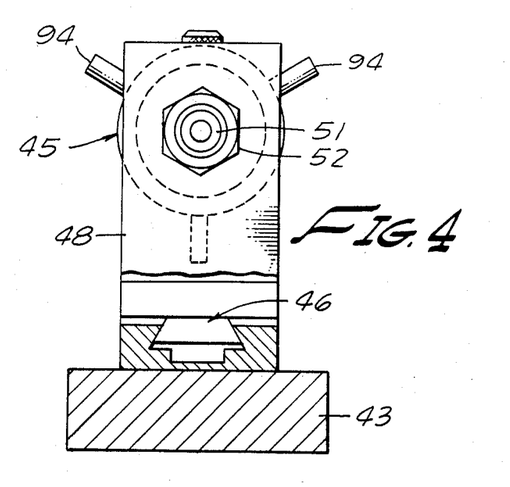
FIG. 4 is a right end elevational view taken along the line 4—4 of FIG. 1.

The crimping station identified generally as 45 (FIG. 1) includes a generally L-shaped mounting bracket 68, the lower arm of which is mounted onto a runner 69 which is slidingly received in a groove in the track 46 (FIGS. 1, 3 and 4). That is, the bracket 68 and the equipment carried thereby may be moved along the track toward or away from the holding station 44, as desired.

With particular reference now to FIG. 6, the crimping station is seen to further include an elongated generally cylindrical body 70 having a reduced diameter threaded end received through an unthreaded opening 71 in the upstanding portion of the L-shaped mounted bracket 68. A nut 72 threaded onto the reduced diameter end secures the body 70 extending generally parallel to the base plate toward the holding station. An axial opening 73 in the body 70 extends completely therethrough and is of a diameter sufficient to permit ready passage of the ferrule 37 therealong.

Figures 5, 7, 8:
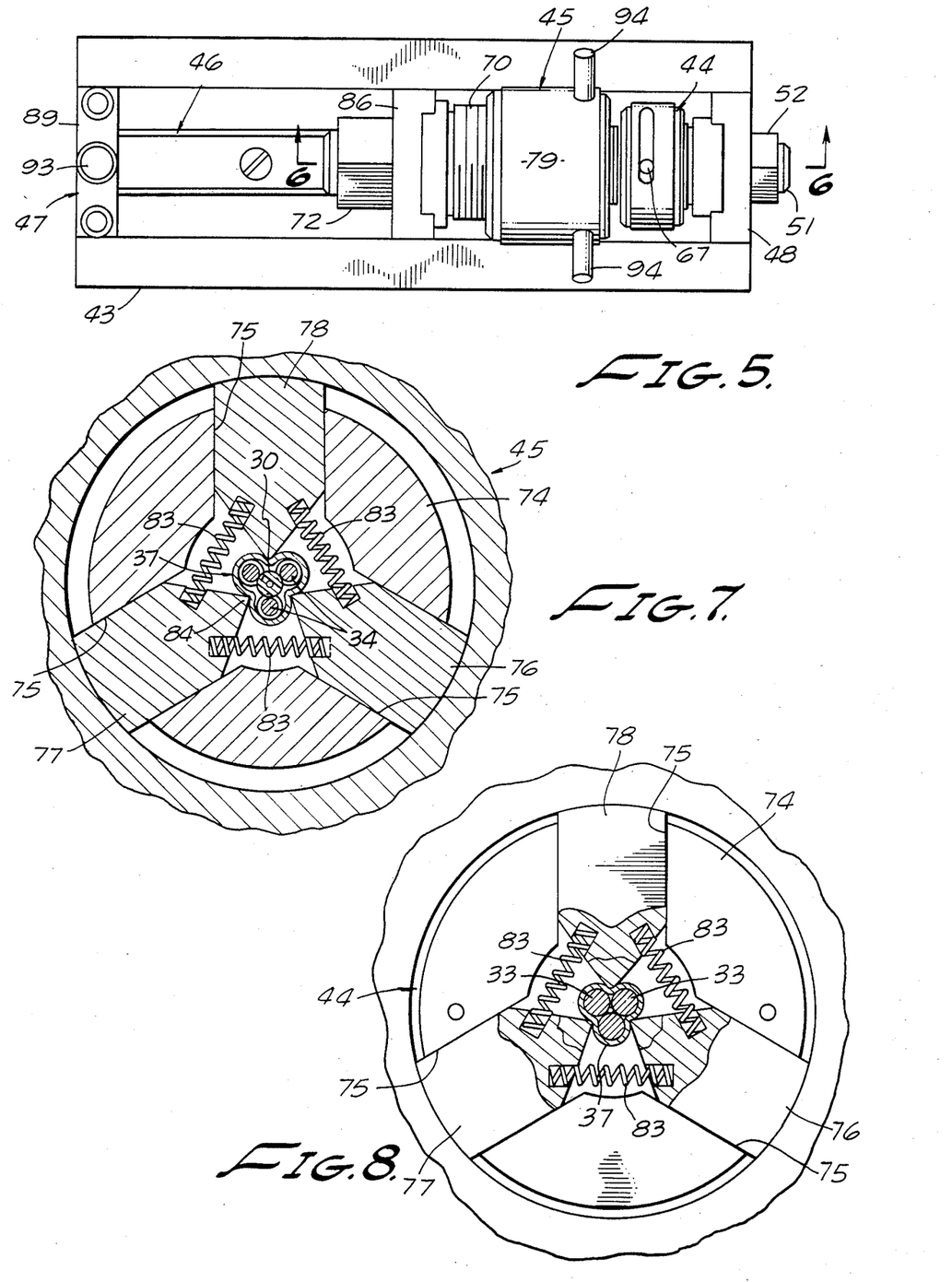
FIG. 5 is a top plan view similar to FIG. 2 showing the crimping and holding stations closed on each other.
FIGS. 7, 8, 9 and 10 are end elevational, sectional views taken along the lines 7—7, 8—8, 9—9 and 10—10, respectively, of FIG. 6.

The body 70 outermost end portion identified generally as at 74 is cylindrical with a smooth periphery and includes three longitudinally extending slots 75 arranged at 120 degrees to one another and communicating with a passageway extending along the axis of 74 (FIGS. 7 and 8). Within the slots 75, there are arranged crimping jaws 76, 77 and 78, respectively, the outer surfaces of which are longitudinally tapered increasing from a minimum at the end of 74 on moving toward the bracket 68 (FIG. 6). A hollow cylindrical shell-like member 79 serves as a coupling ring and has a tapered surface 80 for coacting with the jaws 76-78 to adjust them radially inwardly or outwardly in accordance with the direction of rotation of the coupling ring. Threads 81 on the inner surface of the coupling ring mesh with threads 82 on the periphery of the body 70 via which adjustment of the coupling ring is produced. Springs 83 have their ends received within opposing recesses in the jaws 76-78 providing a force to automatically move the jaws apart upon release of contact between the coupling ring and the tapered outer jaws surfaces (FIG. 7).

Figure 16:
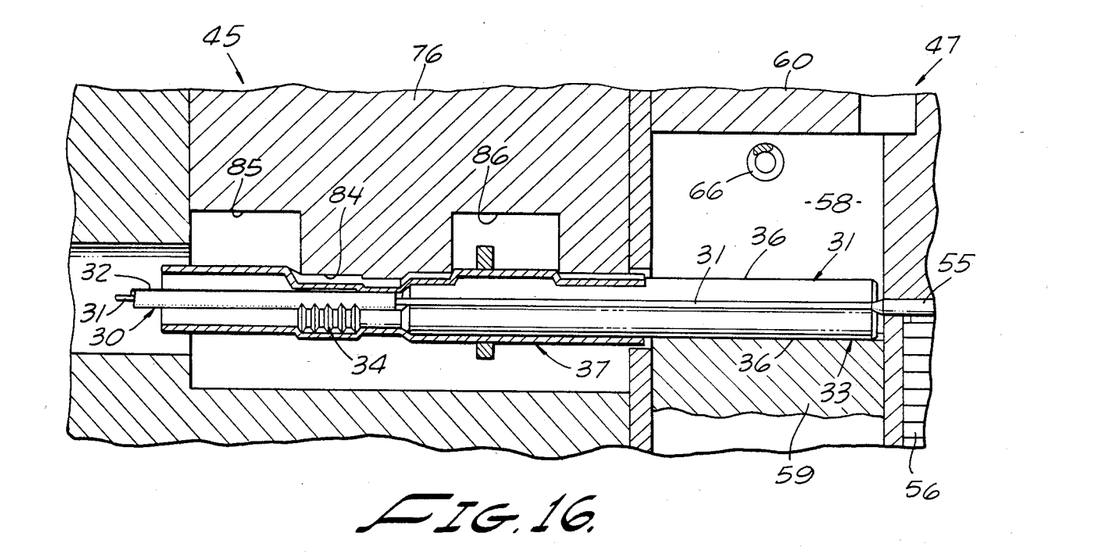
FIG. 16 is a side elevational, sectional view of an optical fiber within the crimping station.

On comparing FIGS. 6, 7 and 16, it is seen that the crimping jaws 76-78 each have a specifically contoured inner surface 84 which, when it is moved against the side of the connector ferrule 37, will bear against those parts of the ferrule that it is desired to deform or crimp. For example, to produce the longitudinal grooves 38-40 knife-like edges on the jaws are provided. Also, where no pressure is desired to be exerted upon the ferrule body wall, indented or deeply grooved regions such as 85 and 86 are located.

Optical Fiber Holding Means

The optical fiber cable holding means 47 shown in FIG. 3 includes an upstanding wall member 87 having its lower end resting on the top of the base plate 43 and affixed to the end of the track 46 by threaded members 88. A floating gripper plate 89 is interrelated to the upper surface of the wall 87 by a pair of threaded means 90 having smooth shank portions slidingly received within openings in the plate 89 and compression springs 91 urging the head of each of the threaded means 90 upwardly away from the plate 87. That is, by virtue of the coaction of the threaded means 90 and springs 91, the plate 89 is resiliently urged downwardly and substantially into contact with the upper surface of the wall 87, but can be moved upwardly against the pressure of the springs to a spaced relation, if so desired. Matching semi-cylindrical grooves in the facing surfaces of the wall 87 and plate 89 form a cylindrical opening 92 of dimensions substantially the same as that of an optic fiber cable. An adjustable retention knob 93 is fitted within a threaded opening in the gripper plate 89 and has an inner end which, depending upon the adjustment of 93, can extend into the opening 92 for bearing against an optic fiber cable located in the opening.

Operation of First Described Embodiment

A jacketed optical fiber cable 30 with an extended length of its buffer-jacketing material removed leaving a bare fiber 31 is inserted through the opening 92 in the fiber cable holding means 47, through the central passageway 73 of the crimping station and outwardly through the crimping jaws central opening (assuming the coupling ring 79 is adjusted to the open position) and an uncrimped ferrule or connector part 37 is located on the bare fiber somewhat as shown in FIG. 1, for example. A set of three rods 33 are inserted within the jaws 57–59 and the jaws are tightened down snugly. The bare fiber is then inserted into the interstice formed by the three rods 33 with the locating pin 55 holding the cleaved fiber end at the proper distance from the outer end faces of the rods. With the bare fiber end so contained within the holding station 44, the knob 93 (FIG. 3) is adjusted to clampingly engage the fiber and hold it substantially horizontally within the entire apparatus.

Next, the ferrule 37 is slid along the bare fiber from the position shown in FIG. 1 to a position in which it is received over the rods 33 (FIG. 6) and against the stop provided by jaws 57–59. With the ferrule so located, the crimping station 45 is moved along the track 46 toward the holding station 44 until the jaws 76–78 are located with the various contoured gripping surfaces 84 lying immediately opposite the corresponding parts on the ferrule. Proper positioning is achieved when the outermost ends of the jaws 76–78 abut directly against the face plate 61 on the holding station chuck. Arms 94 are then rotated which, in turn, rotate the coupling ring 79 to move the jaws inwardly and deform the connector part ferrule 37 about the rods 33. In this way, the connector part 37 is secured about the rods and fiber with the fiber located in properly spaced relation within the rods. Finally, the crimping jaws are loosened, the crimping station is moved away from the finally secured ferrule, the jaws of the holding station are released and the knob 93 of the fiber holding means is loosened permitting the entire optical fiber with connector part in place to be removed from the apparatus.

Alternate Embodiment of Holding Station

For the ensuing description of an alternate form of holding station reference is now made to FIGS. 17–23. It is to be understood that the holding station to be described at this time interacts with the fiber holding means 47 and crimping station 45 as already described.

Figure 17:
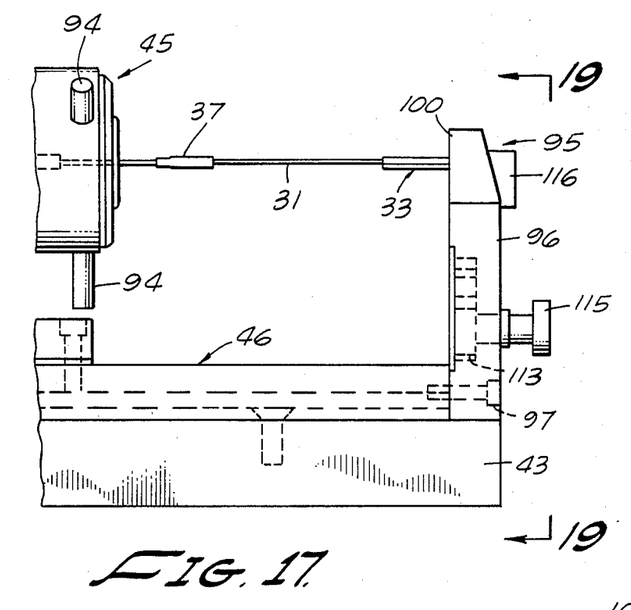
FIG. 17 is a side elevational view of an alternate form of holding station.
Figure 18:
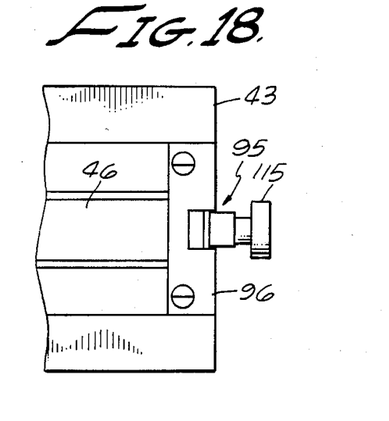
FIG. 18 is a top plan view, partially fragmentary, taken of the holding station of FIG. 17.
Figure 19:
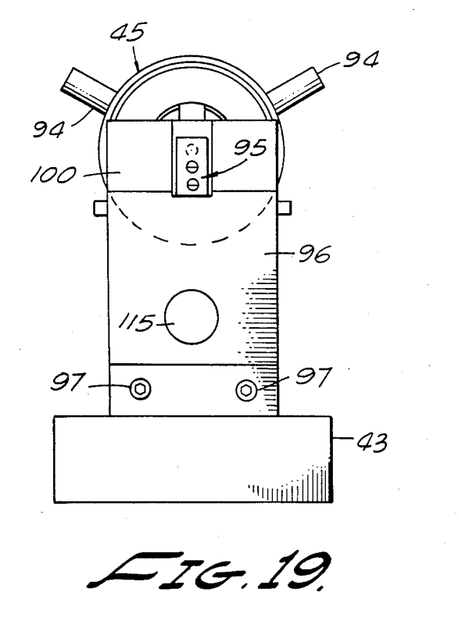
FIG. 19 is an end elevational view taken along 19—19 of FIG. 17.
Figure 20:
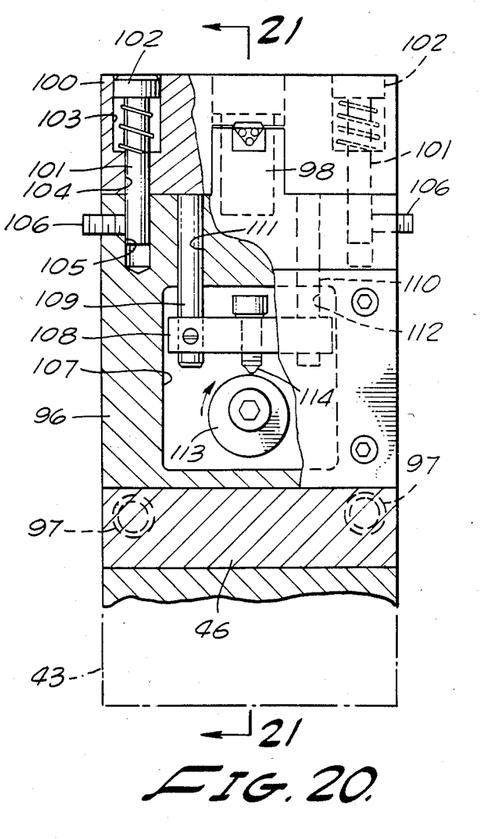
FIG. 20 is an end elevational, sectional elevational view of the holding station of FIG. 17.

The alternate form of holding station is identified in FIG. 17 as at 95 and comprises an upstanding wall plate 96 having its lower end resting on base plate 43 and affixed to the outer end of track 46 by threaded members 97. The upper surface of plate 96 includes a centrally located rectangular portion 98 having a V-shaped notch 99. The notch is precisely formed such that when three alignment rods 33 are located therein they will each contact the others along longitudinal peripheral lines, and the upper two rods will extend slightly above the uppermost surface of rectangular portion 98 (FIG. 22).

A cap plate 100 is generally rectangular and includes a central notch permitting sliding and fitting receipt onto the rectangular portion 98 and the remaining top wall of 96. First and second shafts 101, each with an enlarged head 102 at an upper end, are located with their heads slidingly received within respective openings 103 in the cap plate. The shafts extend downwardly and slidingly through further openings 104 in the cap plate and have their end portions secured within openings 105 in the top surface of plate 96 by set screws 106.

A cavity 107 in the side of plate 96 encloses a transfer block 108 to which are affixed first and second drive rods 109 and 110 that extend through respective openings 111 and 112 in plate 96. An eccentrically mounted roller cam 113 has its peripheral camming surface in continual engagement with a follower pin 114 in the transfer block which can move the drive rods 109–110 from their lowermost position where cap plate 100 rests on plate 96 to an uppermost position where the two plates are held spaced apart. As shown best in FIG. 21, a manually adjustable knob 115 is journaled within plate 96 with its inner end connected to eccentric roller cam 113, by which means the cam may be adjusted and the cap plate raised or lowered, depending on the knob adjustment.

Figures 21, 22, 23:
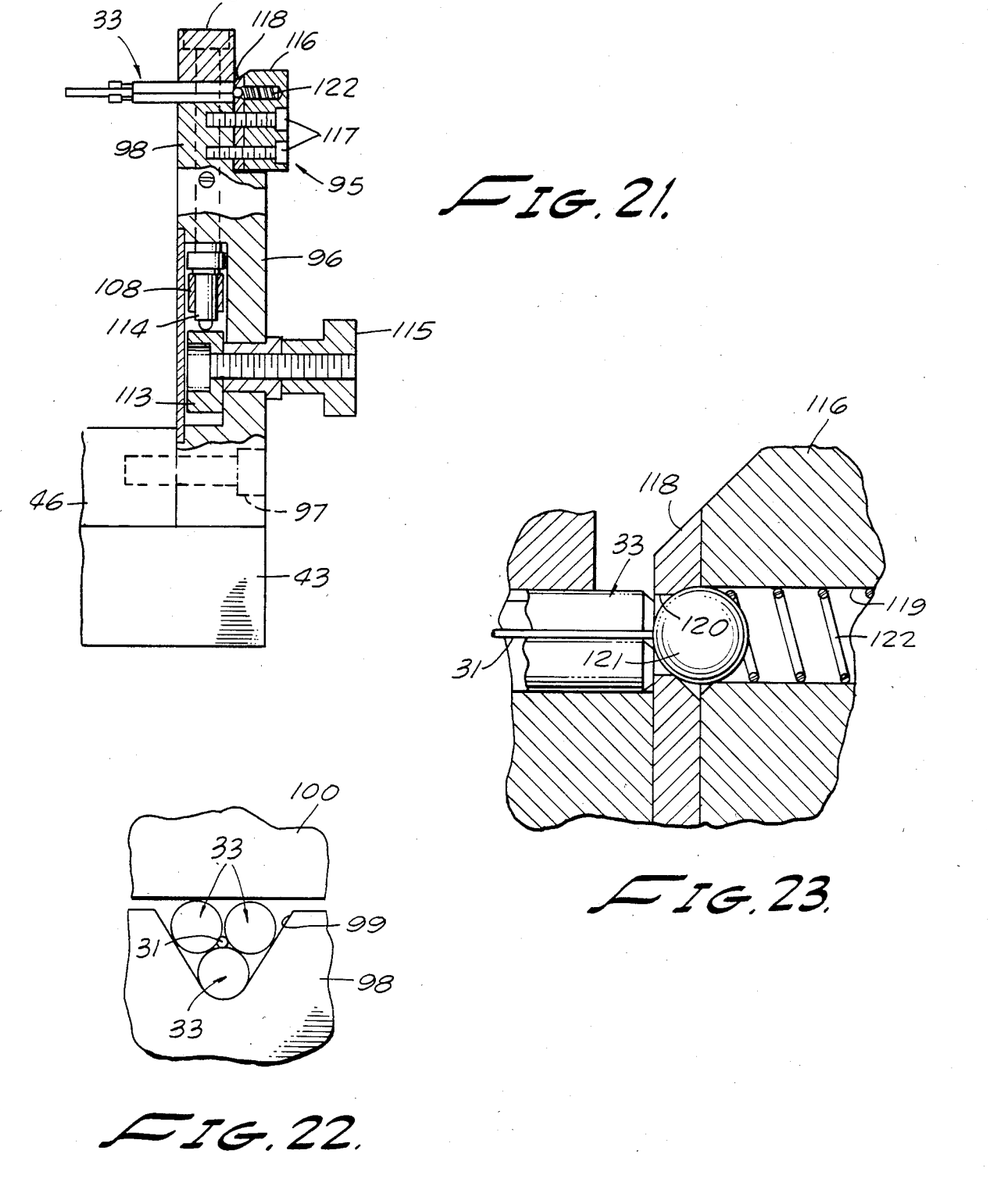
FIG. 21 is a sectional, elevational view taken along the line 21—21 of FIG. 20.
FIG. 22 is an end elevational view slightly enlarged showing three alignment pins being releasably held within retention jaws of the FIG. 17 holding station.
FIG. 23 is an enlarged sectional, partially fragmentary view of a positioning means depicted in FIG. 21.

With reference now to FIGS. 21 and 23, a housing 116 affixed to the outer end surface of the plates 96 and 100 by screws 117 includes a hardened plate 118 located therebetween. An opening 119 in housing 116 is collinear with the interstice axis between rods 33 located in notch 99. An opening 120 in plate 118 is aligned with opening 119 and has a tapered inner entrance portion. A precision ball 121 is resiliently urged by a compression coil spring 122 into the opening in plate 118 and the relative dimensions are such that a portion of the ball 121 extends outwardly of plate 118 and within the interstice of three rods 33 contacting the plate (e.g., 0.0005 inches) to position the fiber end accordingly.

In use of the alternate holding station 95, the fiber with ferrule 37 is inserted through the fiber cable holding means and crimping station as described in regard to the first embodiment. Knob 115 is turned to separate the cap plate 100 from the upstanding plate 96, and a set of three rods 33 are located within the notch and moved into contact with hardened plate 118. The bare fiber is inserted into the interstice formed by the three rods 33 and stops against the ball 121 locating the fiber end inwardly of the rod ends a slight amount. The knob 115 is then adjusted to close the cap plate onto plate 96 and the remainder of the operation is as was previously described.

We claim:

1. Apparatus for affixing a hollow deformable ferrule about three cylindrical rods arranged in parallel, peripheral surface contacting relation with an optical fiber located within the interstice between the rods, an end of said optical fiber being located a predetermined distance from the ends of said rods, comprising:
   base plate means;
   track means on an outer surface of said base plate means having first and second end portions;
   optical fiber holding means mounted on said base plate means adjacent a first end portion of said track means;
   means mounted on said base plate means adjacent the track second end portion for holding said three rods with said interstice therebetween including a stop pin positioned to extend within the interstice of said three rods a predetermined distance; and
   selectively actuatable means mounted on said base plate means and movable along the track means for crimping a ferrule about the three rods with said optical fiber being positioned in the interstice.

2. Apparatus as in claim 1, in which the means for holding three rods includes a shaft having an opening for fittingly receiving the stop pin therein, and chuck jaw means selectively adjustable with respect to an axis colinear with the shaft opening.

3. Apparatus as in claim 1, in which the crimping means includes jaws having contoured surfaces for effecting a predetermined contoured crimping of the ferrule.

4. Apparatus as in claim 2, in which the crimping means has jaws which are selectively movable toward a common axis which is colinear with the chuck jaw means axis.

5. Apparatus as in claim 4, in which the track means maintains the colinearity of said axes as the crimping means moves therealong.

6. Apparatus as in claim 1, in which the optical fiber holding means includes an upstanding wall member, floating gripper plate, spring means for resiliently holding the upstanding wall member and floating gripper plate together, and selectively adjustable retention knob for separating said upstanding wall member from said floating gripper plate.

7. Apparatus for unitarily securing a deformable ferrule about three rods arranged in parallel, peripheral surface contacting relation with an optical fiber located within the interstice between the rods, an end of the fiber being located a predetermined distance inwardly of the ends of the rods, comprising:

chuck means having a longitudinal axis; and a plurality of jaws mounted to said chuck means and selectively adjustable toward and away from the chuck means axis;

each of said jaws including a surface contoured to deform the ferrule along a line between adjacent rods of the three rods and an included optical fiber.

8. Apparatus as in claim 7, in which the chuck means is affixed a movable bracket.

9. Apparatus as in claim 7, in which the jaws are adjusted by arm means extending outwardly of the chuck means.

* * * * *